US012810498B2

(12) United States Patent
Jeon et al.

(10) Patent No.: US 12,810,498 B2
(45) Date of Patent: Nov. 24, 2026

(54) APPARATUS AND METHOD FOR SCENE GRAPH GENERATION AND METHOD FOR ENCODING IMAGE

(71) Applicant: ELECTRONICS AND TELECOMMUNICATIONS RESEARCH INSTITUTE, Daejeon (KR)

(72) Inventors: Sang-Hun Jeon, Daejeon (KR); Yong-Ju Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 252 days.

(21) Appl. No.: 18/612,220

(22) Filed: Mar. 21, 2024

(65) Prior Publication Data

US 2024/0420392 A1 Dec. 19, 2024

(30) Foreign Application Priority Data

Jun. 13, 2023 (KR) ........................ 10-2023-0075718

(51) Int. Cl.
*G06T 11/26* (2026.01)
*G06T 3/18* (2024.01)
(Continued)

(52) U.S. Cl.
CPC ................ *G06T 11/26* (2026.01); *G06T 3/18* (2024.01); *G06T 7/11* (2017.01); *G06T 7/12* (2017.01);
(Continued)

(58) Field of Classification Search
CPC ... G06T 11/26; G06T 7/12; G06T 3/18; G06T 7/162; G06T 2210/61; G06T 2207/20072; G06V 30/18181; G06V 10/7635
See application file for complete search history.

(56) References Cited

U.S. PATENT DOCUMENTS

2020/0394434 A1* 12/2020 Rao ........................ G06V 10/82
2020/0401835 A1* 12/2020 Zhao .................... G06V 10/255
(Continued)

FOREIGN PATENT DOCUMENTS

CN 111292334 A * 6/2020 ............. G06N 3/045
CN 111292335 A * 6/2020 ............. G06N 3/045
(Continued)

OTHER PUBLICATIONS

He, K., Gkioxari, G., Dollár, P., & Girshick, R. (2017). "Mask r-cnn." In Proceedings of the IEEE international conference on computer vision (pp. 2961-2969). (Year: 2019).*
(Continued)

*Primary Examiner* — Michelle L Sams
(74) *Attorney, Agent, or Firm* — LRK PATENT LAW FIRM

(57) ABSTRACT

Disclosed herein is an apparatus and method for scene graph generation. The apparatus may include a backbone network for extracting a first feature map from an input image, an encoder for extracting a second feature map that is based on a mask for the shape of an object within a bounding box using the first feature map and generating a third feature map by combining the first feature map and the second feature map, and a decoder for generating a scene graph by predicting the relationship between objects from the third feature map.

19 Claims, 8 Drawing Sheets

(51) Int. Cl.
*G06T 7/11* (2017.01)
*G06T 7/12* (2017.01)

(52) U.S. Cl.
CPC ............... *G06T 2207/20016* (2013.01); *G06T 2210/12* (2013.01)

(56) References Cited

U.S. PATENT DOCUMENTS

| | | | | |
|---|---|---|---|---|
| 2021/0365724 | A1 * | 11/2021 | Lee | G06T 7/73 |
| 2022/0014807 | A1 * | 1/2022 | Lin | G06N 3/092 |
| 2022/0318559 | A1 * | 10/2022 | Shen | G06V 20/58 |
| 2022/0382553 | A1 | 12/2022 | Li et al. | |
| 2024/0169624 | A1 * | 5/2024 | Brandt | G06F 3/0482 |

FOREIGN PATENT DOCUMENTS

| | | | | |
|---|---|---|---|---|
| DE | 102021124649 | A1 * | 3/2023 | G06N 3/0455 |
| KR | 10-2021-0114074 | A | 9/2021 | |
| KR | 10-2022-0025524 | A | 3/2022 | |

OTHER PUBLICATIONS

Khandelwal, Siddhesh et al., "Iterative Scene Graph Generation", Jul. 27, 2022 https://arxiv.org/pdf/2207.13440 (Year: 2022).*
Siddhesh Khandelwal et al., "Segmentation-grounded Scene Graph Generation", 2021 IEEE/CVF International Conference on Computer Vision (ICCV), Apr. 29, 2021.
Chengjian Feng et al., "TOOD: Task-aligned One-stage Object Detection", 2021 IEEE/CVF International Conference on Computer Vision (ICCV), Aug. 17, 2021.
Haoqin Ji et al., "Backbone Based Feature Enhancement for Object Detection", Computer Vision—ACCV 2020, Feb. 25, 2021.

* cited by examiner

APPARATUS AND METHOD FOR SCENE GRAPH GENERATION AND METHOD FOR ENCODING IMAGE

CROSS REFERENCE TO RELATED APPLICATION

This application claims the benefit of Korean Patent Application No. 10-2023-0075718, filed Jun. 13, 2023, which is hereby incorporated by reference in its entirety into this application.

BACKGROUND OF THE INVENTION

1. Technical Field

The disclosed embodiment relates to scene graph generation for understanding of various types of visual information to which computer vision technology in an Artificial Intelligence (AI) field is applied.

2. Description of Related Art

As a method for extracting information from images/videos, there is scene graph generation technology for inferring the interrelationship between objects.

A scene graph, which is configured with nodes and edges in order to effectively extract information from an image and a video scene, represents various objects and the relationship therebetween using the nodes and the edges, so it may be widely used in AI technology based on various types of visual information.

SUMMARY OF THE INVENTION

An object of the disclosed embodiment is to propose an encoder structure that enables more efficient scene graph generation.

A method for scene graph generation according to an embodiment may include extracting a first feature map from an input image, extracting a second feature map that is based on a mask for the shape of an object within a bounding box using the first feature map, generating a third feature map by combining the first feature map and the second feature map, and generating a scene graph by predicting the relationship between objects from the third feature map.

Here, extracting the second feature map may include generating multiple candidate bounding boxes by applying a convolution layer to the first feature map and generating multiple masks for shapes of objects within the multiple candidate bounding boxes using the first feature map.

Here, generating the multiple candidate bounding boxes may include applying a convolution layer of a first group to the first feature map and performing classification of the bounding box using a binary classifier; and predicting the bounding box by applying a convolution layer of a second group to the first feature map.

Here, predicting the bounding box may comprise setting offsets in multiple directions based on the center point of the object and estimating the location and size of the bounding box.

Here, generating the multiple candidate bounding boxes may comprise adjusting confidence of the predicted bounding box based on a confidence score for the classification of the bounding box and centeredness indicating the degree of matching between the center of the predicted bounding box and that of ground truth (GT).

Here, generating the masks may include extracting a region corresponding to the bounding box from the first feature map and warping the region into a feature map having a preset first resolution, acquiring a convolution feature map by applying a convolution layer to a warped feature map acquired as a result of warping, generating a max-pooled feature map and an average-pooled feature map by performing max pooling and average pooling on the convolution feature map, acquiring an attention map by combining the max-pooled feature map and the average-pooled feature map and applying a nonlinear function to the combination of the max-pooled feature map and the average-pooled feature map, acquiring an up-sampling result having a second resolution higher than the first resolution by performing up-sampling on a result of multiplying the attention map and the convolution feature map, and generating the mask by performing binary classification on the up-sampling result.

Here, extracting the first feature map may include extracting multiple feature maps for respective layers in a backbone network, forming a feature pyramid for fusing information of the multiple feature maps for the respective layers by adding the extracted multiple feature maps for the respective layers in reverse order, and extracting the first feature map having multi-resolution for the image using the feature pyramid.

An apparatus for scene graph generation according to an embodiment may include a backbone network for extracting a first feature map from an input image, an encoder for extracting a second feature map that is based on a mask for the shape of an object within a bounding box using the first feature map and generating a third feature map by combining the first feature map and the second feature map, and a decoder for generating a scene graph by predicting the relationship between objects from the third feature map.

Here, the encoder may include a bounding box generation unit for generating multiple candidate bounding boxes by applying a convolution layer to the first feature map and a mask generation unit for generating multiple masks for shapes of objects within the multiple candidate bounding boxes using the first feature map.

Here, the bounding box generation unit may apply a convolution layer of a first group to the first feature map, perform classification of the bounding box using a binary classifier, and predict the bounding box by applying a convolution layer of a second group to the first feature map.

Here, the bounding box generation unit may set offsets in multiple directions based on the center point of the object and estimate the location and size of the bounding box.

Here, the bounding box generation unit may adjust confidence of the predicted bounding box based on a confidence score for the classification of the bounding box and centeredness indicating the degree of matching between the center of the predicted bounding box and that of ground truth (GT).

Here, the mask generation unit may extract a region corresponding to the bounding box from the first feature map, warp the region into a feature map having a preset first resolution, acquire a convolution feature map by applying a convolution layer to a warped feature map acquired as a result of warping, generate a max-pooled feature map and an average-pooled feature map by performing max pooling and average pooling on the convolution feature map, combine the max-pooled feature map and the average-pooled feature map, acquire an attention map by applying a nonlinear function to the combination of the max-pooled feature map and the average-pooled feature map, multiply the attention map and the convolution feature map, acquire an up-sampling result having a second resolution higher than the first resolution by performing up-sampling on a result of multiplication, and generate the mask by performing binary classification on the up-sampling result.

Here, the backbone network may extract multiple feature maps for respective layers, form a feature pyramid for fusing information of the multiple feature maps for the respective layers by adding the extracted multiple feature maps for the respective layers in reverse order, and extract the first feature map having multi-resolution for the image using the feature pyramid.

A method for image encoding according to an embodiment may include generating multiple candidate bounding boxes by applying a convolution layer to a first feature map extracted from an input image, extracting a second feature map that is based on multiple masks for shapes of objects within the multiple candidate bounding boxes using the first feature map, and generating a third feature map by combining the first feature map and the second feature map.

Here, generating the multiple candidate bounding boxes may include applying a convolution layer of a first group to the first feature map and performing classification of a bounding box using a binary classifier; and predicting the bounding box by applying a convolution layer of a second group to the first feature map.

Here, predicting the bounding box may comprise setting offsets in multiple directions based on the center point of an object and estimating the location and size of the bounding box.

Here, generating the multiple candidate bounding boxes may comprise adjusting confidence of the predicted bounding box based on a confidence score for the classification of the bounding box and centeredness indicating the degree of matching between the center of the predicted bounding box and that of ground truth (GT).

Here, extracting the second feature map may include extracting a region corresponding to the bounding box from the first feature map and warping the region into a feature map having a preset first resolution, acquiring a convolution feature map by applying a convolution layer to a warped feature map acquired as a result of warping, generating a max-pooled feature map and an average-pooled feature map by performing max pooling and average pooling on the convolution feature map, acquiring an attention map by combining the max-pooled feature map and the average-pooled feature map and applying a nonlinear function to the combination of the max-pooled feature map and the average-pooled feature map, acquiring an up-sampling result having a second resolution higher than the first resolution by performing up-sampling on a result of multiplying the attention map and the convolution feature map, and generating the mask by performing binary classification on the up-sampling result.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
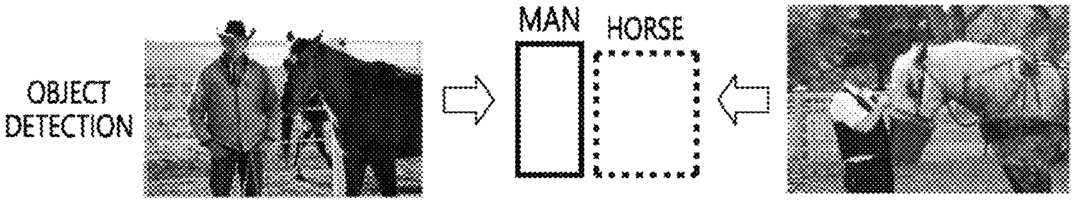
FIG. 1 is an exemplary view for explaining object detection.

The advantages and features of the present disclosure and methods of achieving them will be apparent from the following exemplary embodiments to be described in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

Figure 2:
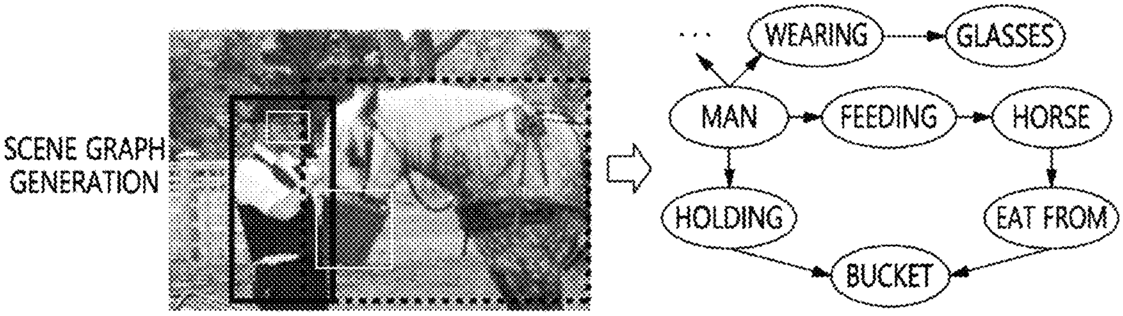
FIG. 2 is an exemplary view of scene graph generation.

FIG. 1 is an exemplary view for explaining object detection, and FIG. 2 is an exemplary view of scene graph generation.

Referring to FIG. 1, general object detection technology typically searches for individual objects, for example, a man, a horse, and the like, in a given image and presents the same. However, referring to FIG. 2, scene graph generation technology not only searches for individual objects but also generates an interrelationship between the found objects, e.g., “wearing”, “feeding”, “eat from”, “holding”, and the like. Accordingly, the scene graph generation technology has higher applicability than technology for merely detecting objects.

Figure 3:
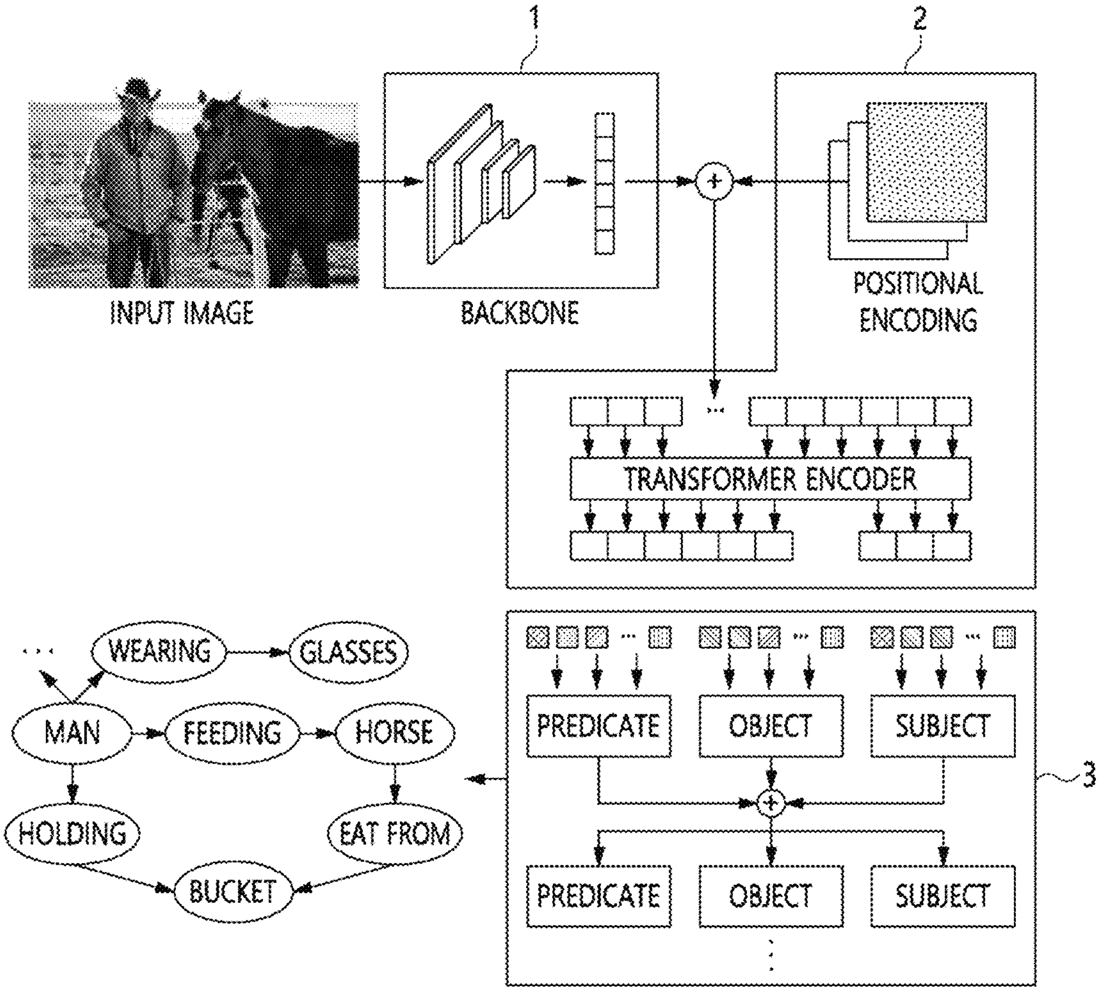
FIG. 3 is a structure diagram of a general scene graph generation apparatus.

FIG. 3 is a structure diagram of a general scene graph generation apparatus.

Referring to FIG. 3, a general scene graph generation apparatus may include a backbone 1, an encoder 2, and a decoder 3.

The backbone 1 is a ResNet-based neural network, and extracts features from still images or video scenes input thereto.

The encoder 2 comprises six encoders, and the features input from the backbone 1 pass through the six encoders 20, whereby a feature map is generated.

The encoder 2 based on a transformer has the same structure as “Detection With Transformer”, which is commonly used in existing object detection models, and generates estimates using factorization. Through this, not the entire model but part of the model is improved using an iterative refinement method. Also, positional information of each pixel may be added to the generated feature map along with positional encoding.

The feature map is input to the decoder 3, and a scene graph is generated by predicting a subject, an object, and a predicate through the iterative refinement process.

Figure 4:
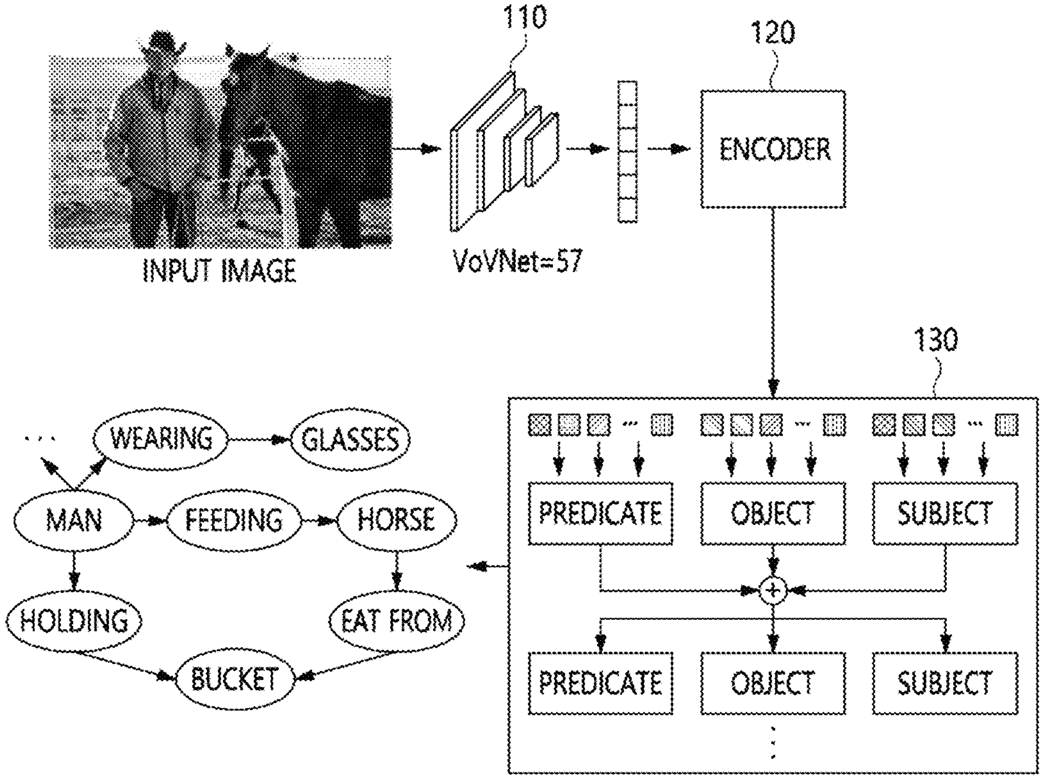
FIG. 4 is a schematic block diagram of an apparatus for scene graph generation according to an embodiment.

FIG. 4 is a schematic block diagram of an apparatus for scene graph generation according to an embodiment.

Referring to FIG. 4, the apparatus for scene graph generation according to an embodiment may include a backbone network 110, an encoder 120, and a decoder 130.

An input image may be, for example, a ranch landscape image, as illustrated in FIG. 4, and animals including horses, a man, and the like may be represented in the ranch landscape image. The apparatus for scene graph generation may detect a horse or a man in the input image.

The backbone network 110 may extract a first feature map from the input image. That is, the backbone network 110 may receive an image for object detection, that is, the input image, and extract a feature map having multi-resolution for the input image.

Here, various neural networks including a ResNet-based neural network or a VoVNet-based neural network, each being configured with multiple convolution layers, may be used in the backbone network 110. The backbone network 110 may extract feature maps having multiple resolutions or scales through operations, for example, up-sampling or down-sampling.

The feature maps for respective layers, which have different resolutions or scales and which are generated by the backbone network 110, may have different pieces of feature information depending on the layers, and a feature pyramid for fusing the different pieces of feature information is formed, after which the first feature map having multi-resolution may be extracted based on the feature pyramid.

According to an embodiment, the backbone network 110 may extract multiple feature maps for respective layers, form a feature pyramid for fusing information of the multiple feature maps for the respective layer by adding the extracted multiple feature maps for the respective layers in reverse order, and extract a first feature map having multi-resolution for the image using the feature pyramid.

The encoder 120 may extract a second feature map that is based on a mask for the shape of an object within a bounding box using the first feature map and generate a third feature map by combining the first feature map and the second feature map.

The decoder 130 predicts the relationship between objects from the third feature map output from the encoder 120, thereby generating a scene graph. That is, the decoder 130 may generate the scene graph by predicting a subject, an object, and a predicate through an iterative refinement process.

Figure 5:
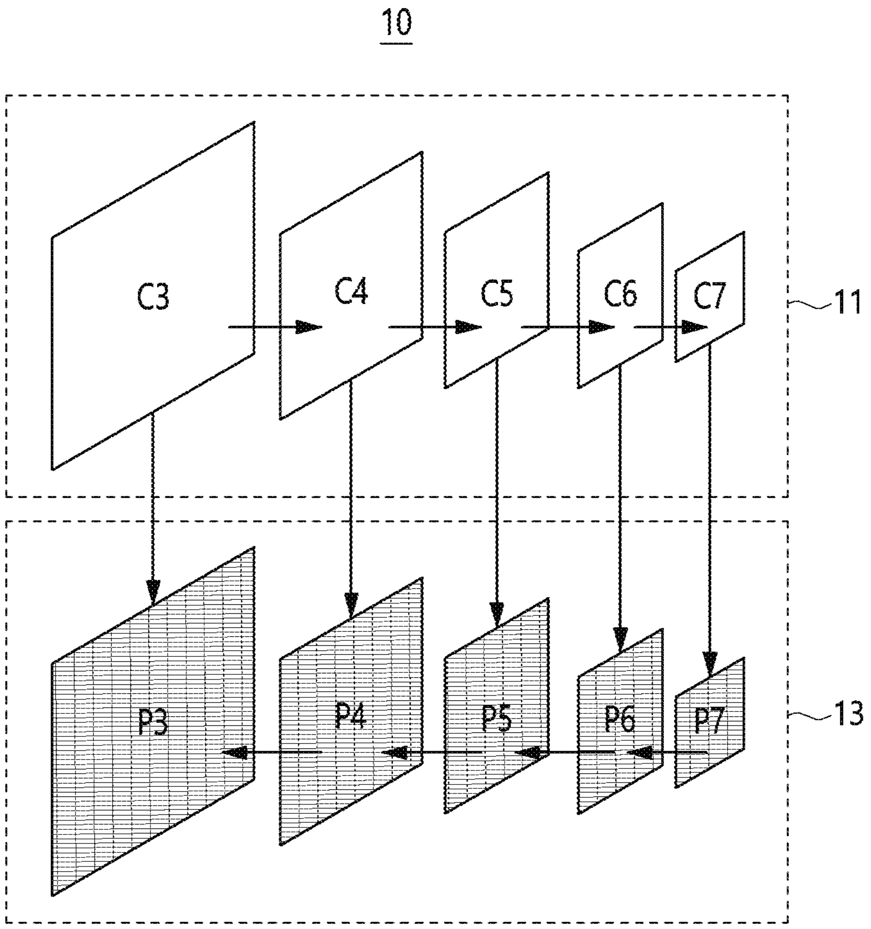
FIG. 5 is an exemplary view of a backbone network according to an embodiment.

FIG. 5 is an exemplary view of a backbone network according to an embodiment.

Referring to FIG. 5, the backbone network 110 according to an embodiment may include multiple convolution layers C3 to C7. Also, a feature pyramid 13 may be formed by adding feature maps P3 to P7 that correspond to the multiple convolution layers C3 to C7, respectively. Particularly, the feature maps P3 to P7 are added in the reverse order of the multiple convolution layers C3 to C7, thereby forming the feature pyramid 13 for fusing the respective pieces of information of the feature maps P3 to P7.

Accordingly, the first feature map having multi-resolution is extracted using the feature pyramid 13, and may then be provided to the encoder 120.

However, the present disclosure is not limited to the method described with reference to FIG. 5, and the backbone network 110 may use any other methods to extract the first feature map to be provided to the encoder 120 from the input image.

Figure 6:
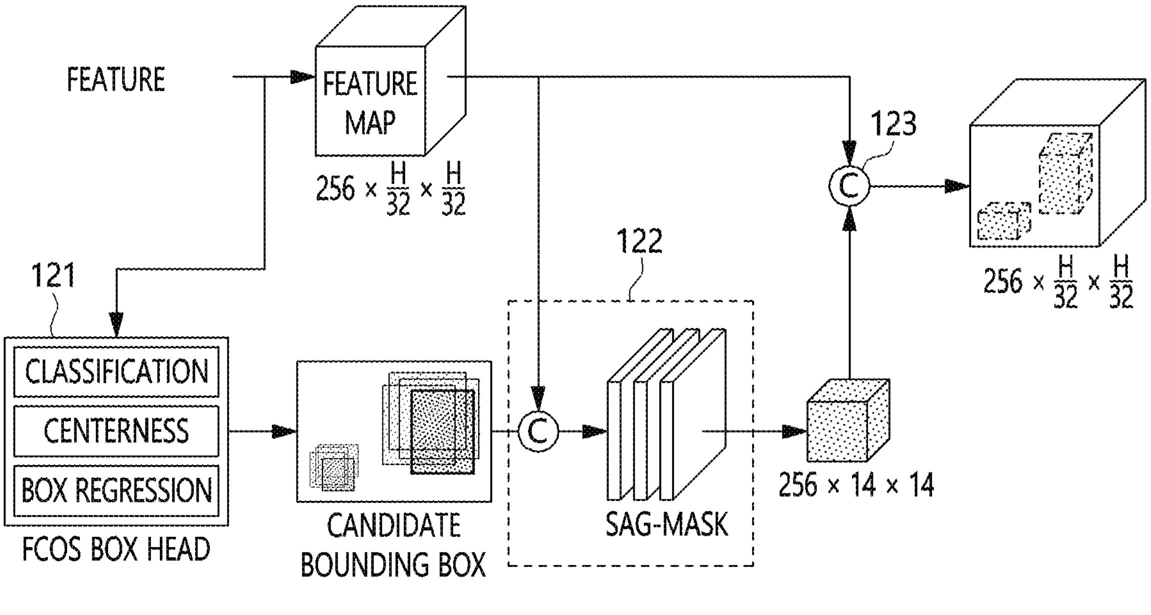
FIG. 6 is an exemplary view of the internal configuration of an encoder according to an embodiment.

FIG. 6 is an exemplary view of the internal configuration of an encoder according to an embodiment.

Referring to FIG. 6, the encoder 120 may include a bounding box generation unit 121, a mask generation unit 122, and a combination unit 123.

The bounding box generation unit 121 may generate multiple candidate bounding boxes by applying a convolution layer to the first feature map.

Here, the bounding box generation unit 121 may apply the convolution layer of a first group to the first feature map and perform classification of the bounding boxes using a binary classifier.

Here, the convolution layer of the first group may include multiple convolution layers, receive the first feature map extracted by the backbone network 110, and provide the output thereof as the input for the task of performing classification of bounding boxes.

Also, the bounding box generation unit 121 may predict a bounding box by applying the convolution layer of a second group to the first feature map.

Here, the convolution layer of the second group may include multiple convolution layers, receive the first feature map extracted by the backbone network 110, and provide the output thereof as the input for the task of performing prediction of a bounding box.

Here, according to an embodiment, the bounding box generation unit 121 may set offsets in multiple directions based on the center point of an object and estimate the location and size of a bounding box (centerness).

Here, according to an embodiment, the bounding box generation unit 121 may adjust the confidence of the predicted bounding box based on a confidence score for the classification of the bounding box and centeredness indicating the degree of matching between the center of the predicted bounding box and that of ground truth (GT).

Here, according to an embodiment, the mask generation unit 122 may extract a region corresponding to the bounding box from the feature map and warp the same into a feature map having a preset resolution, acquire a convolution feature map by applying a convolution layer to a warped feature map acquired as the result of warping, perform max pooling and average pooling on the convolution feature map, and combine the max-pooled feature map and the average-pooled feature map.

Also, the mask generation unit 122 acquires an attention map by applying a nonlinear function to the combination of the max-pooled feature map and the average-pooled feature map, multiplies the attention map and the convolution feature map, and performs binary classification for the multiplication result, thereby generating a mask.

According to an embodiment, object detection and segmentation based on points are performed without using a predefined anchor box requiring a high computational load and high memory usage, whereby efficiency may be achieved in terms the computational load and memory usage. Furthermore, real-time object detection and segmentation may be realized in various fields including robots, drones, autonomous vehicles, and the like based on a platform having low computing power (e.g., an embedded platform).

Figure 7:
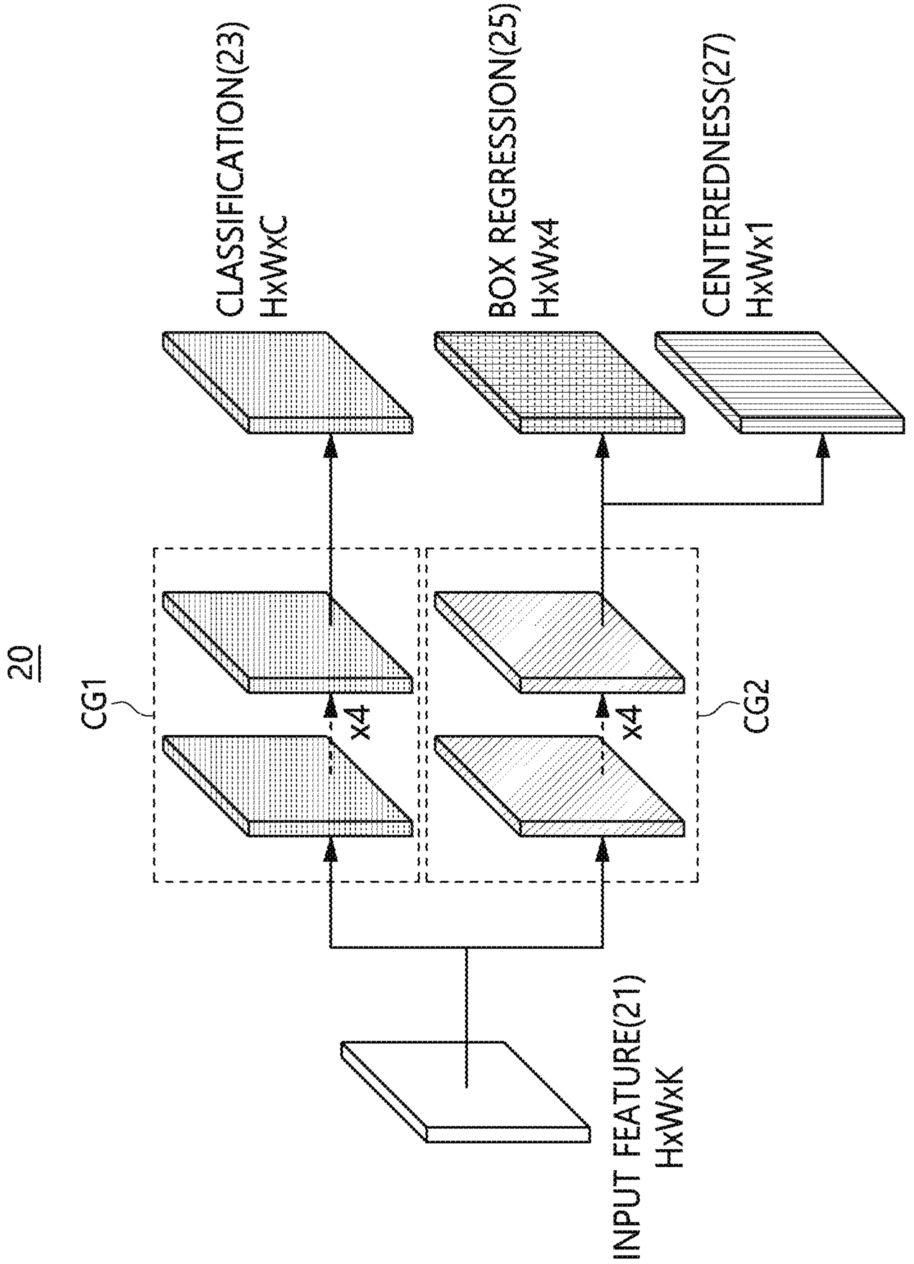
FIG. 7 is an exemplary view for explaining a bounding box generation unit according to an embodiment.

FIG. 7 is an exemplary view for explaining a bounding box generation unit according to an embodiment.

Referring to FIG. 7, the bounding box generation unit 121 of an object detection system according to an embodiment of the present disclosure may perform classification 23 of a bounding box by applying convolution layers CG1 and CG2 of multiple groups to an input feature 21 corresponding to the feature map extracted by the backbone network 110 or perform prediction of a bounding box (box regression) 25 based on centeredness 27. Here, each of the convolution layers CG1 and CG2 of the multiple groups may include multiple convolution layers.

When the convolution layer CG1 of the first group, among the convolution layers CG1 and CG2 of the multiple groups, is applied to the input feature 21, the result may be provided as the input of the task for performing classification 23 of a bounding box. The task for performing classification 23 of a bounding box may classify a bounding box from the input feature 21 using, for example, a binary classifier.

Meanwhile, when the convolution layer CG2 of the second group, among the convolution layers CG1 and CG2 of the multiple groups, is applied to the input feature 21, the result may be provided as the input of the task for performing prediction 25 of a bounding box. The task for performing prediction 25 of a bounding box may set offsets in multiple directions based on the center point of an object and estimate the location and size of a bounding box.

For example, the task for performing prediction 25 of a bounding box may set offsets in four directions, including top (T), bottom (B), left (L), and right (R) directions, based on the center point of an object and estimate the location and size of the bounding box classified to surround the object.

Also, the task for performing prediction 25 of a bounding box may adjust the confidence of the predicted bounding box based on the centeredness 27, and the centeredness 27 may indicate the confidence score for the classification of the bounding box and the degree of matching between the center of the predicted bounding box and that of GT.

In this way, the bounding box generation unit 121 may predict or determine the bounding box for performing object detection based on a point (that is, a center point) without using a predefined anchor box.

However, the present disclosure is not limited to the method described with reference to FIG. 7, and the bounding box generation unit 121 may use any other methods to predict or determine the bounding box for performing object detection based on a point.

Figure 8:
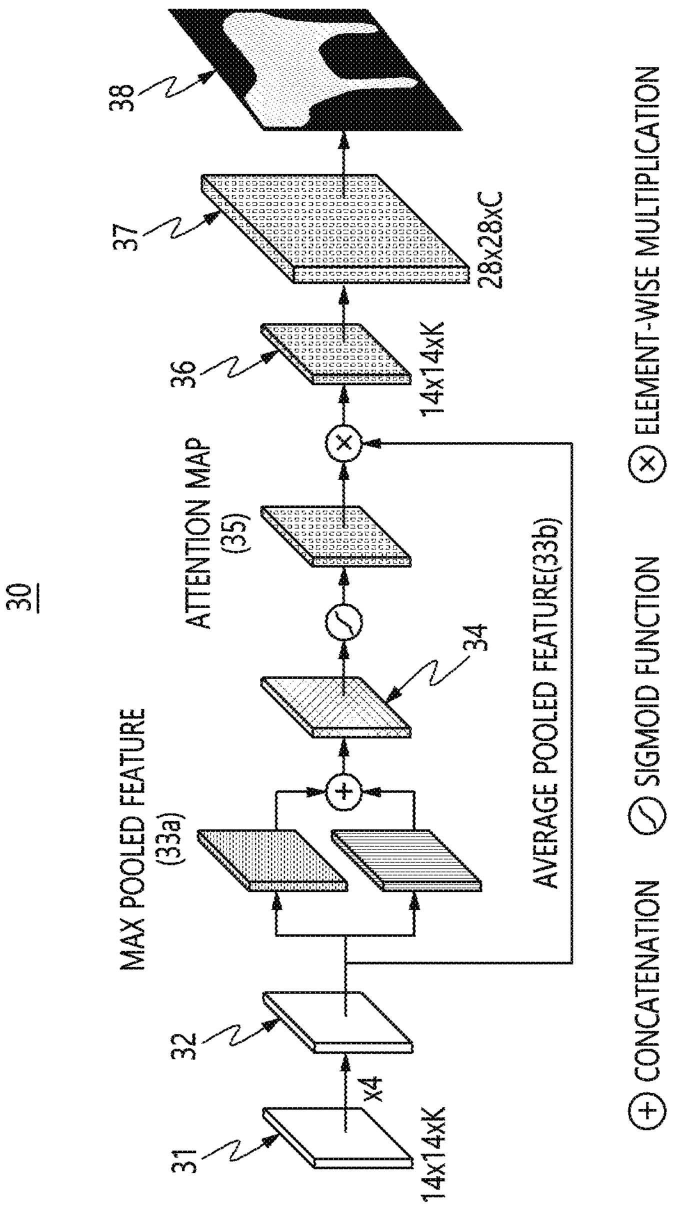
FIG. 8 is an exemplary view for explaining a mask generation unit according to an embodiment.

FIG. 8 is an exemplary view for explaining a mask generation unit according to an embodiment.

Referring to FIG. 8, the mask generation unit 122 may generate multiple masks for the shapes of objects within multiple candidate bounding boxes using the first feature map.

Here, using the feature map extracted by the backbone network 110, the mask generation unit 122 may generate a mask 38 for the shape of an object within the bounding box predicted by the bounding box generation unit 121.

To this end, the mask generation unit 122 may extract a region corresponding to the bounding box from the feature map and warp the same into a feature map having a preset resolution, for example, the resolution of 14×14. The mask generation unit 122 may acquire a convolution feature map 32 by applying a convolution layer to the warped feature map 31 and generate a max-pooled feature map 33*a* and an average-pooled feature map 33*b* by performing max pooling and average pooling on the convolution feature map 32.

Subsequently, the mask generation unit 122 may generate a combined feature map 34 by combining the max-pooled feature map 33*a* and the average-pooled feature map 33*b* and acquire an attention map 35 by applying a nonlinear function, e.g., a sigmoid function, to the combined feature map 34.

Subsequently, the mask generation unit 122 multiplies the attention map 35 and the convolution feature map 32, acquires an up-sampling result 37, e.g., an up-sampling result having the resolution of 28×28, by performing up-sampling on the multiplication result 36, and performs binary classification on the up-sampling result, thereby generating a mask 38.

However, the present disclosure is not limited to the method described with reference to FIG. 8, and the mask generation unit 122 may use any other methods to generate a mask for the shape of an object within the bounding box predicted by the bounding box generation unit 121 by using the feature map extracted by the backbone network 110.

Figure 9:
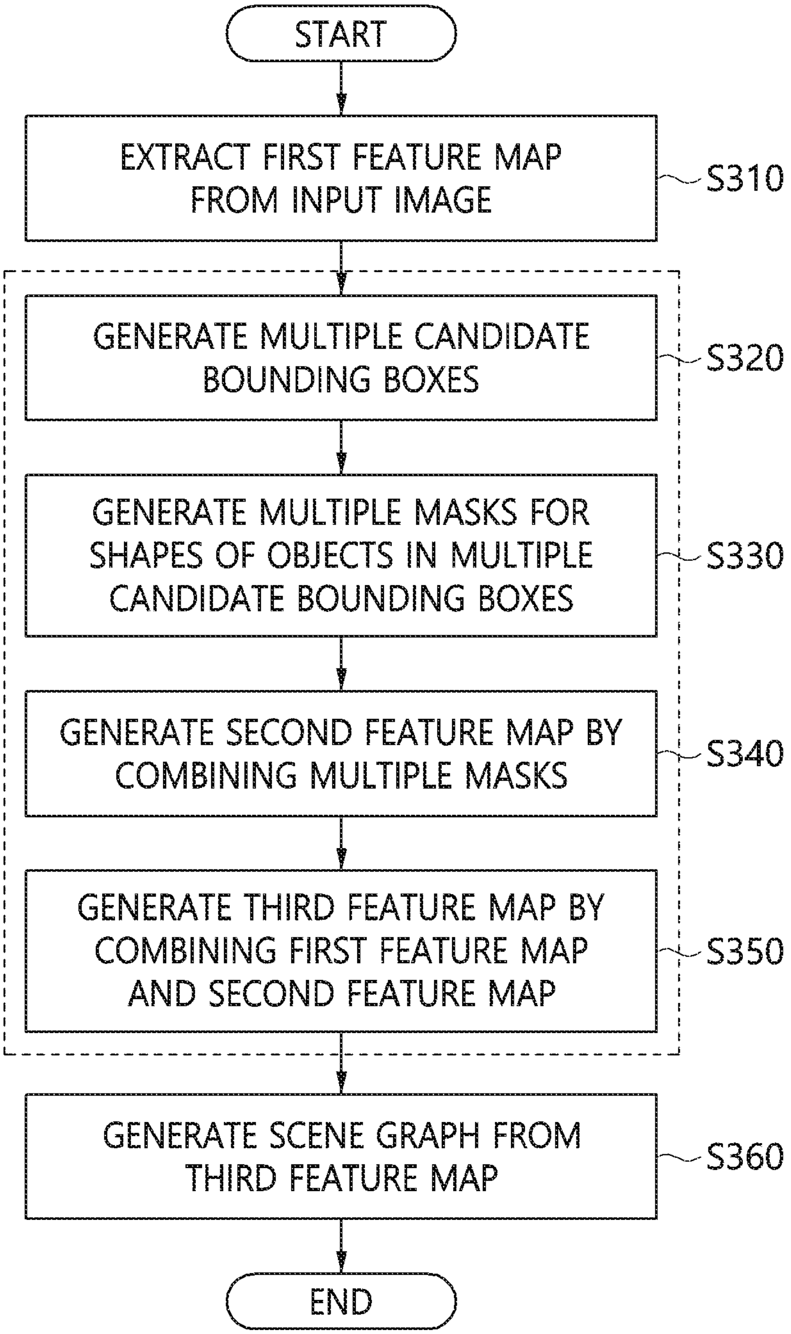
FIG. 9 is a flowchart for explaining a method for scene graph generation according to an embodiment.

FIG. 9 is a flowchart for explaining a method for scene graph generation according to an embodiment.

Referring to FIG. 9, the method for scene graph generation according to an embodiment may include extracting a first feature map from an input image at step S310, extracting a second feature map that is based on a mask for the shape of an object within a bounding box using the first feature map at steps S320 to S340, generating a third feature map by combining the first feature map and the second feature map at step S350, and generating a scene graph by predicting the relationship between objects from the third feature map at step S360.

Here, extracting the second feature map may include generating multiple candidate bounding boxes by applying a convolution layer to the first feature map at step S320 and generating multiple masks for the shapes of objects within the multiple candidate bounding boxes using the first feature map at step S330.

Here, generating the multiple candidate bounding boxes at step S320 may include applying the convolution layer of a first group to the first feature map and performing classification of a bounding box using a binary classifier; and predicting the bounding box by applying the convolution layer of a second group to the first feature map.

Here, predicting the bounding box may comprise setting offsets in multiple directions based on the center point of the object and estimating the location and size of the bounding box.

Here, generating the multiple candidate bounding boxes may comprise adjusting the confidence of the predicted bounding box based on a confidence score for the classification of the bounding box and centeredness indicating the degree of matching between the center of the predicted bounding box and that of ground truth (GT).

Here, generating the masks at step S330 may include extracting a region corresponding to the bounding box from the first feature map and warping the same into a feature map having a preset first resolution, acquiring a convolution feature map by applying a convolution layer to a warped feature map acquired as the result of warping, generating a max-pooled feature map and an average-pooled feature map by performing max pooling and average pooling on the convolution feature map, acquiring an attention map by combining the max-pooled feature map and the average-pooled feature map and applying a nonlinear function to the combination of the max-pooled feature map and the average-pooled feature map, acquiring an up-sampling result having a second resolution higher than the first resolution by multiplying the attention map and the convolution feature map and performing up-sampling on the multiplication result, and generating the mask by performing binary classification on the up-sampling result.

Here, extracting the first feature map at step S310 may include extracting multiple feature maps for respective layers from a backbone network, forming a feature pyramid for fusing information of the multiple feature maps for the respective layers by adding the extracted multiple feature maps for the respective layers in reverse order, and extracting the first feature map having multi-resolution for the image using the feature pyramid.

Hereinbelow, scene graph generation performance according to an embodiment will be described.

Table 1 and Table 2 show a result of comparing the performance of three models based on recall (Recall®20/50/100), mean recall (Mean Recall®20/50/100), and average precision (AP®50/75).

Here, the recall is the result of measuring the capability of finding True Positives (TP) among all predictions (TP+FN), and may be defined as shown in Equation (1) below:

$$\text{Recall} = \frac{TP}{TP + FN} \tag{1}$$

In Equation (1), a True Positive (TP) means that a model predicts a label and it matches an answer correctly, and a False Negative (FN) means that a model does not predict a label but it is part of an actual measurement.

The average precision may be calculated as a weighted average of precisions, which are the rates of correct detection among all detection results at respective threshold values.

TABLE 1

| Model | Encoder | Decoder | R@20/50/100 | mR@20/50/100 |
|---|---|---|---|---|
| A | Existing encoder | Existing decoder | 19.39/23.72/26.08 | 10.54/12.92/14.43 |
| B | Proposed encoder | Existing decoder | 11.07/13.88/15.33<br>(↓) 8.32/9.84/10.75 | 6.49/8.15/10.19<br>(↓) 4.05/4.77/4.24 |
| C | Proposed encoder | Proposed decoder | 24.43/27.28/28.78<br>(↑) 13.36/13.40/13.45 | 11.10/12.90/13.79<br>(↑) 4.61/4.75/3.60 |

TABLE 2

| Model | Encoder | Decoder | AP | AP50 | AP75 |
|---|---|---|---|---|---|
| A | Existing encoder | Existing decoder | 3.8104 | 9.0753 | 2.7341 |
| B | Proposed encoder | Existing decoder | 4.6168<br>(↑) 0.81 | 10.0654<br>(↑) 0.99 | 3.5859<br>(↑) 0.85 |
| C | Proposed encoder | Proposed decoder | 13.4100<br>(↑) 8.79 | 23.6500<br>(↑) 13.58 | 12.7300<br>(↑) 9.14 |

When the recall and mean recall are compared between the models, model B that changes only the backbone exhibits its lower performance than the existing model (model A) because the recall value and the mean recall value decrease by 8.32/9.84/10.75 and 4.05/4.77/4.24. This indicates that model B does not show biased performance improvement in head class predicate results, compared to model A.

Also, model C proposed in the present disclosure is a model that changes both the backbone and the encoder, and the recall and the mean recall thereof increase by 13.36/13.40/13.45 and 4.61/4.75/3.60, compared to model B. In the case of AP, both model B and model C have improved performance, compared to model A. Also, unlike the recall, the AP of model B increases by 0.81/0.99/0.85. Also, the AP of model C increases by 9.60/14.57/10.00 and 8.79/13.58/9.14 compared to model A and model B. Consequently, when the proposed new method is applied to the backbone and encoder of the existing scene graph research model, rather than changing only the backbone, better performance improvement is exhibited in the three quantitative metrics.

Figure 10:
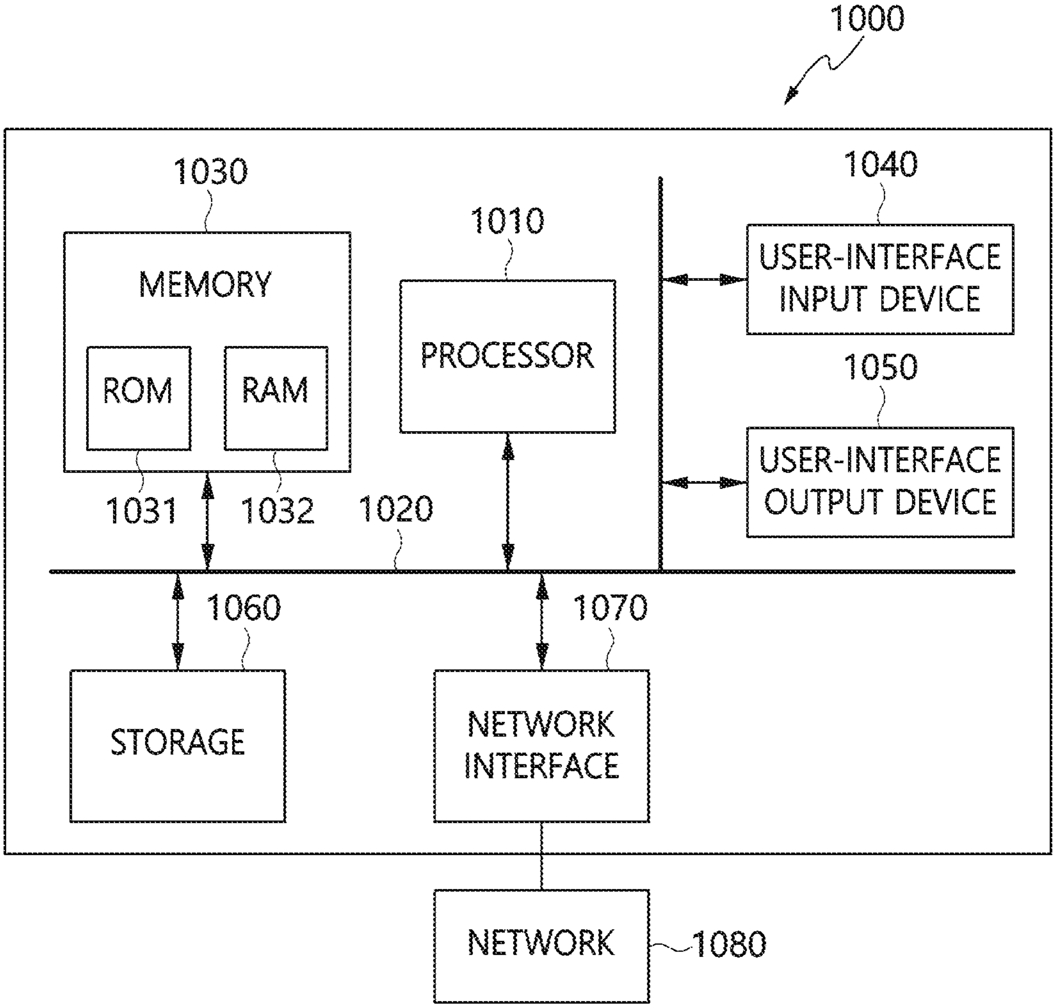
FIG. 10 is a view illustrating a computer system configuration according to an embodiment.

FIG. 10 is a view illustrating a computer system configuration according to an embodiment.

The apparatus for scene graph generation according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected with a network 1080. The processor 1010 may be a central processing unit or a semiconductor device for executing a program or processing instructions stored in the memory 1030 or the storage 1060.

The memory 1030 and the storage 1060 may be storage media including at least one of a volatile medium, a non-volatile medium, a detachable medium, a non-detachable medium, a communication medium, or an information delivery medium, or a combination thereof. For example, the memory 1030 may include ROM 1031 or RAM 1032.

According to the disclosed embodiment, an encoder structure enabling efficient scene graph generation is proposed, whereby effective inference and understanding of the interrelationship between objects in scene information at a more detailed level may be realized. Accordingly, relationship information in scenes may be used in a smart city, smart manufacturing, and a smart environment as an application domain in which various intelligent agents are widely used.

Although embodiments of the present disclosure have been described with reference to the accompanying drawings, those skilled in the art will appreciate that the present disclosure may be practiced in other specific forms without changing the technical spirit or essential features of the present disclosure. Therefore, the embodiments described above are illustrative in all aspects and should not be understood as limiting the present disclosure.

What is claimed is:

1. A method for scene graph generation, comprising:
- extracting a first feature map from an input image;
- generating a plurality of masks for shapes of objects within a plurality of candidate bounding boxes using the first feature map;
- generating a second feature map by combining the plurality of masks;
- generating a third feature map by combining the first feature map and the second feature map; and
- generating a scene graph by predicting a subject, an object, and a predicate through an iterative refinement process from the third feature map.

2. The method of claim 1, wherein generating the second feature map includes:
- generating multiple candidate bounding boxes by applying a convolution layer to the first feature map; and
- generating multiple masks for shapes of objects within the multiple candidate bounding boxes using the first feature map.

3. The method of claim 2, wherein generating the multiple candidate bounding boxes includes:
- applying a convolution layer of a first group to the first feature map and performing classification of the bounding box using a binary classifier; and
- predicting the bounding box by applying a convolution layer of a second group to the first feature map.

4. The method of claim 3, wherein predicting the bounding box comprises setting offsets in multiple directions based on a center point of the object and estimating a location and size of the bounding box.

5. The method of claim 3, wherein generating the multiple candidate bounding boxes comprises adjusting confidence of the predicted bounding box based on a confidence score for the classification of the bounding box and centeredness indicating a degree of matching between a center of the predicted bounding box and a center of ground truth (GT).

6. The method of claim 2, wherein generating the masks includes:
- extracting a region corresponding to the bounding box from the first feature map and warping the region into a feature map having a preset first resolution;
- acquiring a convolution feature map by applying a convolution layer to a warped feature map acquired as a result of warping;
- generating a max-pooled feature map and an average-pooled feature map by performing max pooling and average pooling on the convolution feature map;
- acquiring an attention map by combining the max-pooled feature map and the average-pooled feature map and applying a nonlinear function to a combination of the max-pooled feature map and the average-pooled feature map;
- acquiring an up-sampling result having a second resolution higher than the first resolution by performing up-sampling on a result of multiplying the attention map and the convolution feature map; and
- generating the mask by performing binary classification on the up-sampling result.

7. The method of claim 1, wherein extracting the first feature map includes:
- extracting multiple feature maps for respective layers in a backbone network;
- forming a feature pyramid for fusing information of the multiple feature maps for the respective layers by adding the extracted multiple feature maps for the respective layers in reverse order; and
- extracting the first feature map having multi-resolution for the image using the feature pyramid.

8. An apparatus for scene graph generation, comprising:
- a backbone network for extracting a first feature map from an input image;
- an encoder for generating a plurality of masks for shapes of objects within a plurality of candidate bounding boxes using the first feature map, generating a second feature map by combining the plurality of masks, and generating a third feature map by combining the first feature map and the second feature map; and
- a decoder for generating a scene graph by predicting a subject, an object, and a predicate through an iterative refinement process from the third feature map.

9. The apparatus of claim 8, wherein the encoder includes:
- a bounding box generation unit for generating multiple candidate bounding boxes by applying a convolution layer to the first feature map; and
- a mask generation unit for generating multiple masks for shapes of objects within the multiple candidate bounding boxes using the first feature map.

10. The apparatus of claim 9, wherein the bounding box generation unit applies a convolution layer of a first group to the first feature map, performs classification of the bounding box using a binary classifier, and predicts the bounding box by applying a convolution layer of a second group to the first feature map.

11. The apparatus of claim 10, wherein the bounding box generation unit sets offsets in multiple directions based on a center point of the object and estimates a location and size of the bounding box.

12. The apparatus of claim 10, wherein the bounding box generation unit adjusts confidence of the predicted bounding box based on a confidence score for the classification of the bounding box and centeredness indicating a degree of matching between a center of the predicted bounding box and a center of ground truth (GT).

13. The apparatus of claim 9, wherein the mask generation unit extracts a region corresponding to the bounding box from the first feature map, warps the region into a feature map having a preset first resolution, acquires a convolution feature map by applying a convolution layer to a warped feature map acquired as a result of warping, generates a max-pooled feature map and an average-pooled feature map by performing max pooling and average pooling on the convolution feature map, combines the max-pooled feature map and the average-pooled feature map, acquires an attention map by applying a nonlinear function to a combination of the max-pooled feature map and the average-pooled feature map, multiplies the attention map and the convolution feature map, acquires an up-sampling result having a second resolution higher than the first resolution by performing up-sampling on a result of multiplication, and generates the mask by performing binary classification on the up-sampling result.

14. The apparatus of claim 8, wherein the backbone network extracts multiple feature maps for respective layers, forms a feature pyramid for fusing information of the multiple feature maps for the respective layers by adding the extracted multiple feature maps for the respective layers in reverse order, and extracts the first feature map having multi-resolution for the image using the feature pyramid.

15. A method for image encoding, comprising:

generating multiple candidate bounding boxes by applying a convolution layer to a first feature map extracted from an input image;

generating a plurality of masks for shapes of objects within the plurality of candidate bounding boxes using the first feature map;

generating a second feature map by combining the plurality of masks; and generating a third feature map by combining the first feature map and the second feature map.

16. The method of claim 15, wherein generating the multiple candidate bounding boxes includes:

applying a convolution layer of a first group to the first feature map and performing classification of a bounding box using a binary classifier; and predicting the bounding box by applying a convolution layer of a second group to the first feature map.

17. The method of claim 16, wherein predicting the bounding box comprises setting offsets in multiple directions based on a center point of an object and estimating a location and size of the bounding box.

18. The method of claim 16, wherein generating the multiple candidate bounding boxes comprises adjusting confidence of the predicted bounding box based on a confidence score for the classification of the bounding box and centeredness indicating a degree of matching between a center of the predicted bounding box and a center of ground truth (GT).

19. The method of claim 16, wherein generating the plurality of masks includes:

extracting a region corresponding to the bounding box from the first feature map and warping the region into a feature map having a preset first resolution;

acquiring a convolution feature map by applying a convolution layer to a warped feature map acquired as a result of warping;

generating a max-pooled feature map and an average-pooled feature map by performing max pooling and average pooling on the convolution feature map;

acquiring an attention map by combining the max-pooled feature map and the average-pooled feature map and applying a nonlinear function to a combination of the max-pooled feature map and the average-pooled feature map;

acquiring an up-sampling result having a second resolution higher than the first resolution by performing up-sampling on a result of multiplying the attention map and the convolution feature map; and generating the mask by performing binary classification on the up-sampling result.

* * * * *